US010733790B2

(12) United States Patent
Popov

(10) Patent No.: US 10,733,790 B2
(45) Date of Patent: Aug. 4, 2020

(54) SYSTEMS AND METHODS FOR CREATING AND DISPLAYING INTERACTIVE 3D REPRESENTATIONS OF REAL OBJECTS

(71) Applicant: CAPPASITY INC., Santa Clara, CA (US)

(72) Inventor: Konstantin S. Popov, Moscow (RU)

(73) Assignee: Cappasity Inc., Santa Clara, CA (US)

( * ) Notice: Subject to any disclaimer, the term of this patent is extended or adjusted under 35 U.S.C. 154(b) by 119 days.

(21) Appl. No.: 16/035,417

(22) Filed: Jul. 13, 2018

(65) Prior Publication Data

US 2019/0019327 A1 Jan. 17, 2019

Related U.S. Application Data

(60) Provisional application No. 62/532,900, filed on Jul. 14, 2017.

(51) Int. Cl.

| | |
|---|---|
| ***G06K 9/00*** | (2006.01) |
| ***G06T 15/10*** | (2011.01) |
| ***G06T 7/55*** | (2017.01) |
| ***G06F 16/583*** | (2019.01) |
| ***G06T 3/40*** | (2006.01) |
| ***G06T 19/00*** | (2011.01) |

(52) U.S. Cl.

CPC ............ *G06T 15/10* (2013.01); *G06F 16/583* (2019.01); *G06K 9/00201* (2013.01); *G06T 3/40* (2013.01); *G06T 7/55* (2017.01); *G06T 19/003* (2013.01)

(58) Field of Classification Search

CPC ......... G06T 1/0021; G06T 15/10; G06T 7/55; G06T 3/40; G06T 19/003; H04N 1/32336; G06F 16/583; G06K 9/00201; G06K 9/003

See application file for complete search history.

(56) References Cited

U.S. PATENT DOCUMENTS

| | | | |
|---|---|---|---|
| 2014/0198178 A1 | 7/2014 | Ioffe et al. | |
| 2015/0130799 A1 | 5/2015 | Holzer et al. | |
| 2015/0269785 A1 | 9/2015 | Bell et al. | |
| 2016/0150217 A1 | 5/2016 | Popov | |
| 2017/0148223 A1 | 5/2017 | Holzer et al. | |
| 2018/0345129 A1* | 12/2018 | Rathod | ................. H04W 4/029 |

OTHER PUBLICATIONS

Jan. 21, 2019 Int'l Search Report and Written Opinion for PCT App. No. PCT/US2018/041899 (18 pgs).

Nov. 30, 2018 Partial International Search Results, for Application No. PCT/US2018/041899.

International Preliminary Report on Patentability issued in application No. PCT/US2018/041899 dated Jan. 14, 2020.

* cited by examiner

*Primary Examiner* — Duy M Dang

(74) *Attorney, Agent, or Firm* — Knobbe, Martens, Olson & Bear, LLP

(57) ABSTRACT

Systems and methods are disclosed for generating a 3D view of an object. At least a 360 degree view of an object is recorded by rotating the object or moving a camera around an object. The data can be used to generate a 3D view that allows users to rotate an item to see the corresponding images.

20 Claims, 12 Drawing Sheets

100 109 105 107 101 103 104

SYSTEMS AND METHODS FOR CREATING AND DISPLAYING INTERACTIVE 3D REPRESENTATIONS OF REAL OBJECTS

INCORPORATION BY REFERENCE TO ANY PRIORITY APPLICATIONS

This disclosure claims the benefit of priority to U.S. Provisional Patent App. No. 62/532,900 filed on Jul. 14, 2017. Any and all applications for which a foreign or domestic priority claim is identified in the Application Data Sheet as filed with the present application.

FIELD OF THE DISCLOSURE

The disclosure generally relates to 3D image generation.

BACKGROUND

Cameras can take pictures of objects, but the resulting images show a 2-dimensional (2D) representation of the object.

SUMMARY

Some aspects feature a method for generating a 3D view of an object, the method comprising: capturing image data from a plurality of viewpoints around an object; analyzing the image data for quality; creating a dataset of images based on the image data; filtering the dataset of images; generating data reference parameters; and uploading the dataset of images through a network to a server.

The method can include one, all, or any combination of the following features. The image data includes a video. The image data includes a plurality of pictures. Capturing the image data includes rotating the object while capturing the image data using a stationary camera. Capturing the image data includes moving a camera in an orbit around the object. The method can further include analyzing the image data for quality includes detecting blurriness or artifacts in images included in the image data to identify low quality images. The method can further include excluding the low quality images from the dataset of images. The method can further include compensating for non-constant relative rotation of the object and a camera capturing the image data. The method can further include normalizing a scaling of the object in the image data by resizing at least one image. The method can further include creating a zoom image dataset including images that are higher resolution version of images included in the dataset of images. The dataset of images includes: a plurality of images of the object from different viewpoints around the object; and for each of the plurality of images, data indicating the respective position or angle of the object in the image. The data reference parameters include: data about equipment used for capturing the image data; one or more recording parameters used for capturing the image data; a dimension of the object; and data about the shape of the object. The dataset of images does not include 3D mesh frame or 3D geometric model data.

Some aspects feature a computer system comprising: a data store including a plurality of 3D views for objects; and one or more processors configured to execute computer-readable instructions. The one or more processors can execute the computer-readable instructions to: receive a request for a 3D view for an object; transmit the 3D view for the object; and receive a data log including usage statistics about the frequency at which the object is viewed from different angles.

The computer system can include one, all, or any combination of the following features. The one or more processors are further configured to: transmit data for generating a user interface including a graph generated based at least in part on the data log and a 3D view of the object. The graph indicates an aggregate or average viewing durations of the object based on a plurality of data logs for the object. An x-axis of the graph shows a viewpoint for viewing the object from; the y-axis of the graph indicates a duration of viewing the object; and the duration for each (x, y) point on the graph is based on a duration of a range of viewpoints. The one or more processors are further configured to, based at least in part on the data log, indicate a most popular viewpoint or a viewpoint viewed for a longest duration. The one or more processors are further configured to: receive an indication of a device type or rendering environment; and select, from among a plurality of supplemental data, a first supplemental data for generating the 3D view in response to the device type or rendering environment; and transmit the first supplemental data. The one or more processors are further configured to: receive a request to show a zoomed in view of the object; and in response to the request, transmit at least an image from a zoom dataset of the object.

DETAILED DESCRIPTION

Introduction

Cameras can take 2D images of objects, such as people, clothing, and the like. In many cases, it can be more desirable to present the object in 3D so that the object can be rotated and seen from different angles.

Specialized 3D depth scanning systems can scan and analyze the depth of the objects to generate a 3D model, but these specialized 3D depth scanning systems can require expensive equipment and technical expertise beyond the resources of many people.

A full 3D model that includes details about the 3D structure, 3D mesh frame, and 3D geometric model may be unnecessary for displaying 3D representations of models in some situations. For example, sharing 3D views to show objects to friends, presenting 3D views of objects online for sale, and using displaying 3D views in virtual reality or augmented reality can be performed without generating a mesh frame or 3D geometric model.

Systems and methods are disclosed herein for creating digital representations of objects that appear as 3D views that can be rotated and seen from different angles. The 3D views can look similar to full-fledged 3D content without including mesh frame or 3D geometric model data. A video and/or sequence of pictures of the object can be captured by a camera as the object is rotated. The video and/or pictures can be processed to generate an interactive visualization where the object can be rotated and viewed from different angles. The interactive visualization can be saved in a first format that includes the video and/or pictures and/or other data. The interactive visualization can also be saved separately and formatted for embedding on other platforms. When users view the interactive visualization, users can rotate the object to see it from various angles, and a server can track analytics associated with the user behavior, such as viewing patterns of users to determine which viewing angles are popular.

Rotating Object

Figure 1:
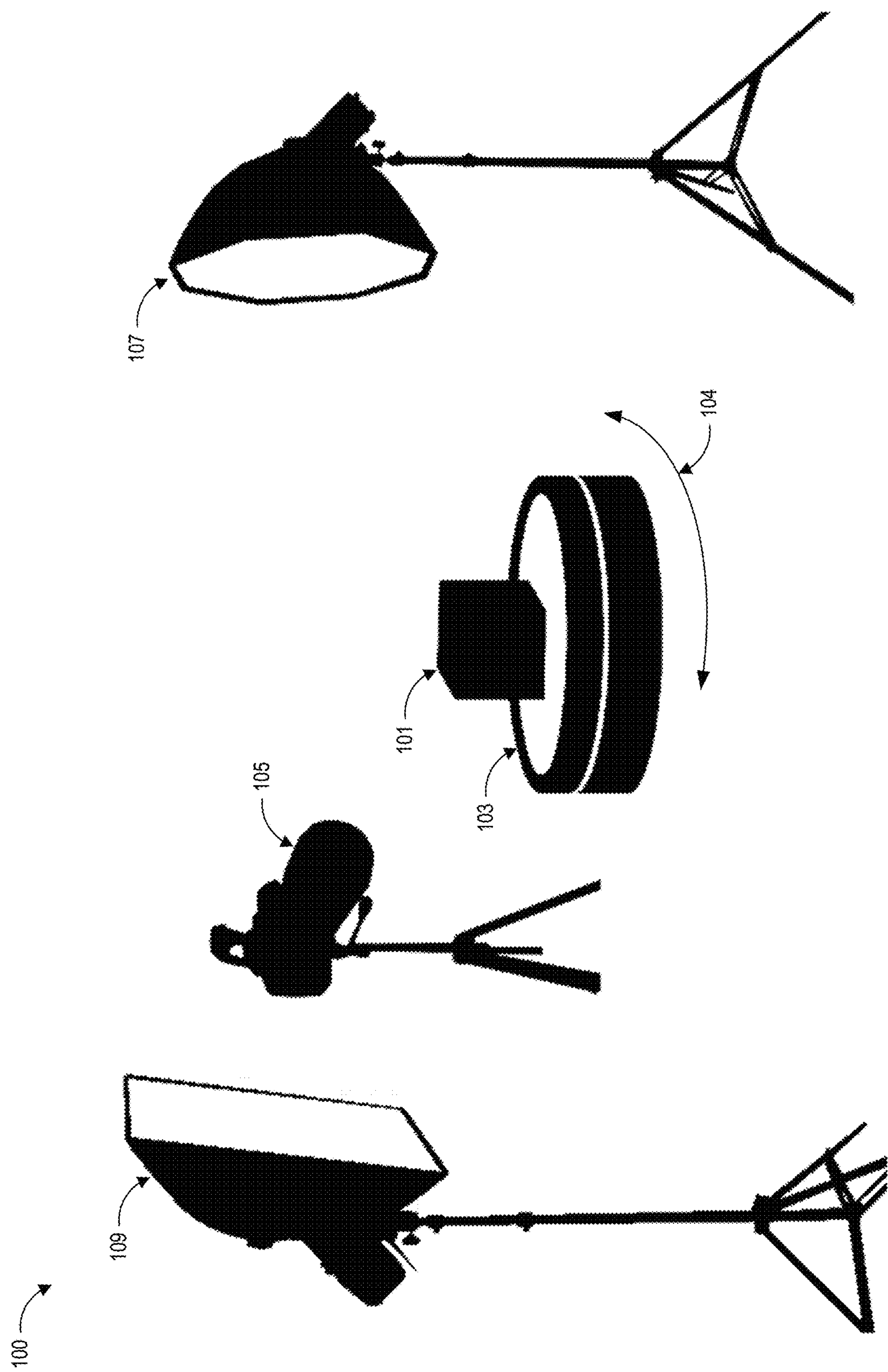
FIG. 1 shows an example system for generating a 3D view of an object using a static camera and rotating the object.

FIG. 1 shows an example system 100 for generating a 3D view of an object using a static camera by rotating the object. The system includes an object 101 on a turntable 103 that can rotate 104. A camera 105 is placed in a static position, and one or more lights 107, 109 can be used to illuminate the object 101.

The object 101 can be any object for which a 3D view is to be generated. Examples include clothing, tools, furniture, mannequins or models, cars, jewelry, crafts, accessories, and the like.

The camera 105 can be configured to record a video or a sequence of images as the object 101 is rotated. The camera 105 can be a smartphone camera, photo camera, video camera, or any similar device for capturing images or videos.

The turntable 103 can be any platform that can rotate as indicated by the arrows 104. Motorized turntables 103 can be used to rotate the object 101 at a constant motorized speed. Turntables 103 can be implemented using any rotating surface, such as a sheet of paper. The sheet of paper, along with any object 101 resting on the sheet of paper, can be rotated as indicated by the arrows 104. Speed variations, such as non-uniformities in rotation speed when manually rotating a paper, can be detected and adjusted during processing.

The lights 107, 109 can be used to illuminate the object 101 to provide clearly lit pictures or videos. The lights 107, 109 can provide uniform lighting of the object from different angles.

The camera 105 can be configured to take a video or sequence of pictures as the object 101 rotates. The turntable 104 can be used to rotate the object 101. In some embodiments, other techniques can be used to rotate the object 101, such as using thin, nearly invisible strings to rotate the object. The object 101 can be rotated at least one full turn or 360 degrees to provide image data for all angles. In some cases, the object 101 can be rotated more than one turn, such as 1.5 turns, 2 turns, or more to provide more image data for processing. If more than one image of an angle is provided, such as when the object is rotated two full turns, then for any angle, a better (such as sharper, clearer, better lit, more focused, and the like) image can be selected for use.

Orbiting Camera

Figure 2:
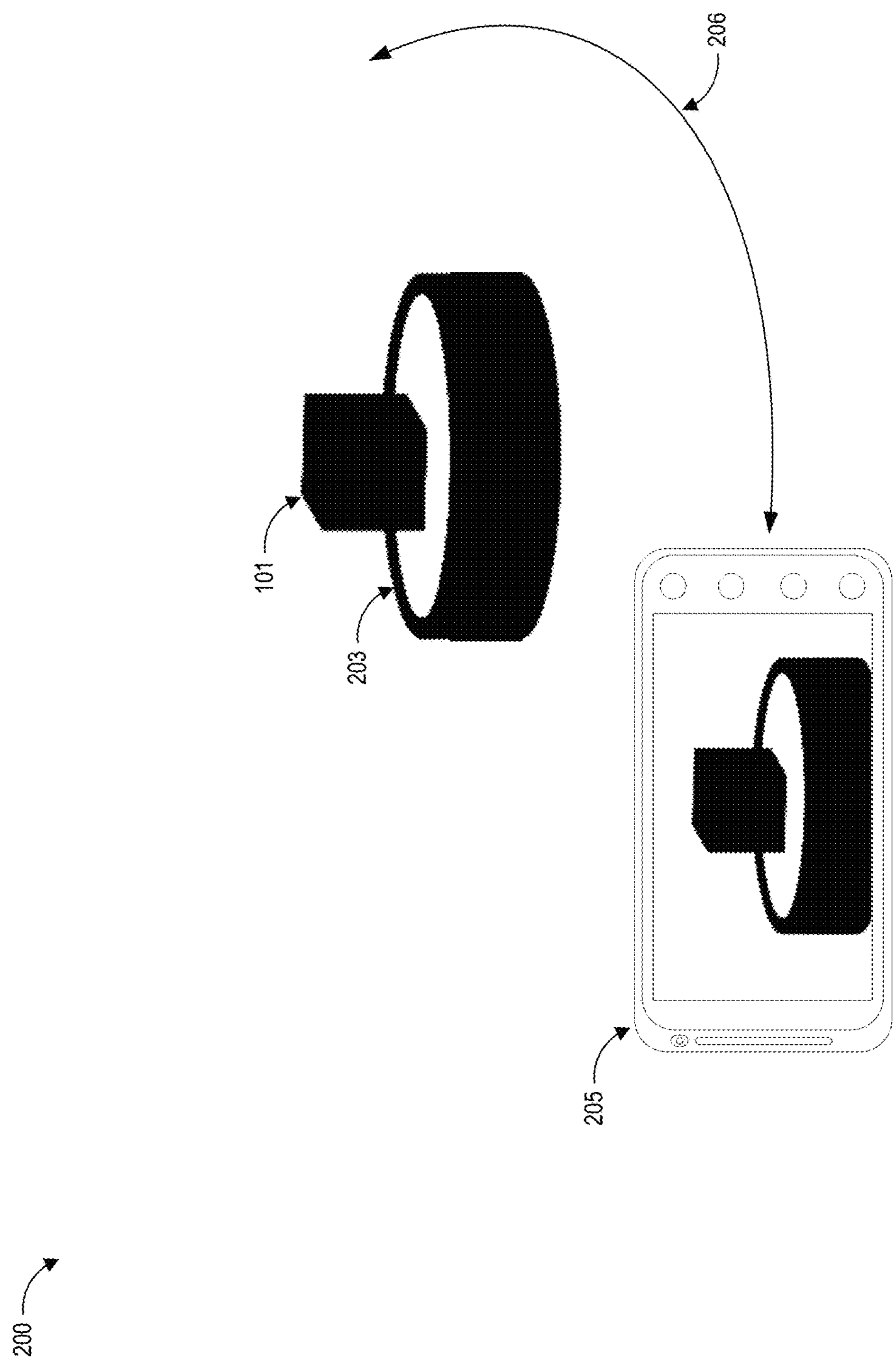
FIG. 2 shows an example system for generating a 3D view of a static object using a moving camera.

FIG. 2 shows an example system 200 for generating a 3D view of a static object using a moving camera. The system includes an object 101 on a surface 203 that can be a static surface. A camera 205 orbits the object 101 to take pictures or video of the object.

The object 101 can be any object for which a 3D view is to be generated. Examples include clothing, tools, furniture, models, and the like. The object can be illuminated by lights (not shown in FIG. 2).

The camera 205 is be configured to record a video or a sequence of images as the camera 205 rotates or orbits around the object 101. The camera 205 can be moved, for example, by a person holding the camera 205 or along a track. The camera can orbit the object 101 for at least one full turn (360 degrees) or more to provide image data for all angles. The camera 205 is shown as a smartphone camera, but the camera 205 can also be a photo camera, video camera, or any similar device for capturing images or videos.

Example 3D Views

Figures 3A, 3B, 3C:
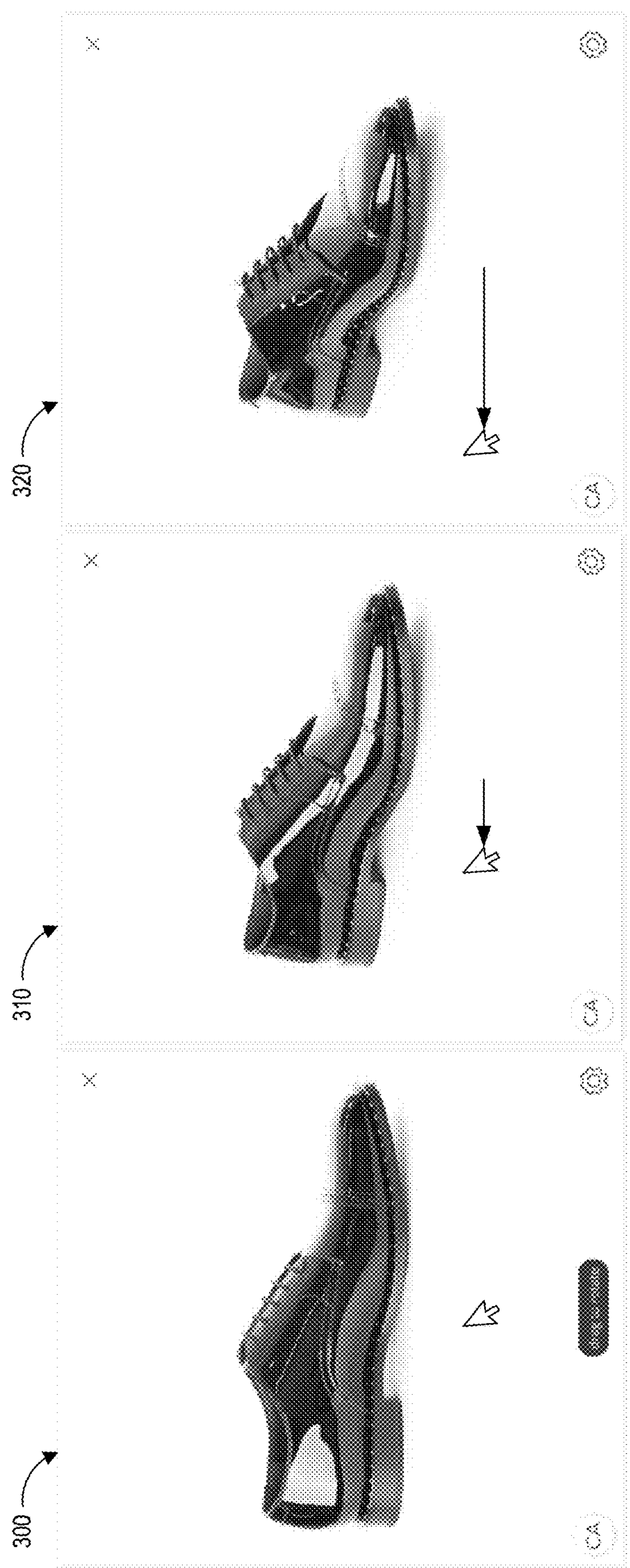
FIG. 3A-3C shows example 3D views for an object.

The data captured from the cameras can be processed to generate 3D views. FIG. 3A, FIG. 3B, and FIG. 3C show example 3D views for a shoe 301. FIG. 3A shows a first 3D view 300 of the shoe 301. A user can interact with the 3D view of the shoe using a cursor or other input device such as a touchpad, keyboard, controller, voice commands, and the like. For example, the user can click the 3D view 300 and drag to the left, causing the 3D view 300 to rotate clockwise. FIG. 3B shows a second view 310 where the shoe is rotated counter clockwise by a first angle in response to dragging of the cursor to the left by a first amount. FIG. 3C shows a second view 320 where the shoe is rotated counter clockwise by a second angle in response to dragging of the cursor to the left by a first amount. When a 3D view is presented on a screen, the view of the object can rotate in response to, such as proportionally with, a movement of a cursor. The view of the object can also rotate, for example, continuously or incrementally in response to inputs, such as pressing of the left or right button on a keyboard.

When the user stops dragging, the 3D view 300, 310, or 320 can stop rotating. The user can also select to zoom in on the shoe object 301 from any of the presented angles. The user can provide a command to zoom, for example, by pressing a zoom button (not shown), pressing buttons on the keyboard such as "+" or "−", dragging the mouse up or down, and the like.

The 3D view 300, 310, or 320 can be rotated to show how the object looks from the plurality of viewpoints that orbit around the object. These views of the object can correspond to the pictures or video frames taken by the camera at each respective position about the object described with respect to FIG. 1 and FIG. 2. The 3D views can provide for a contiguous 360-degree rotation of the object such that the object can be rotated between any two viewing angles (for example, from 27 degrees to 245 degrees in a clockwise or counter-clockwise direction). The 3D view can be generated without data about the 3D structure, 3D mesh frame, and/or 3D geometric model.

Figure 4A:
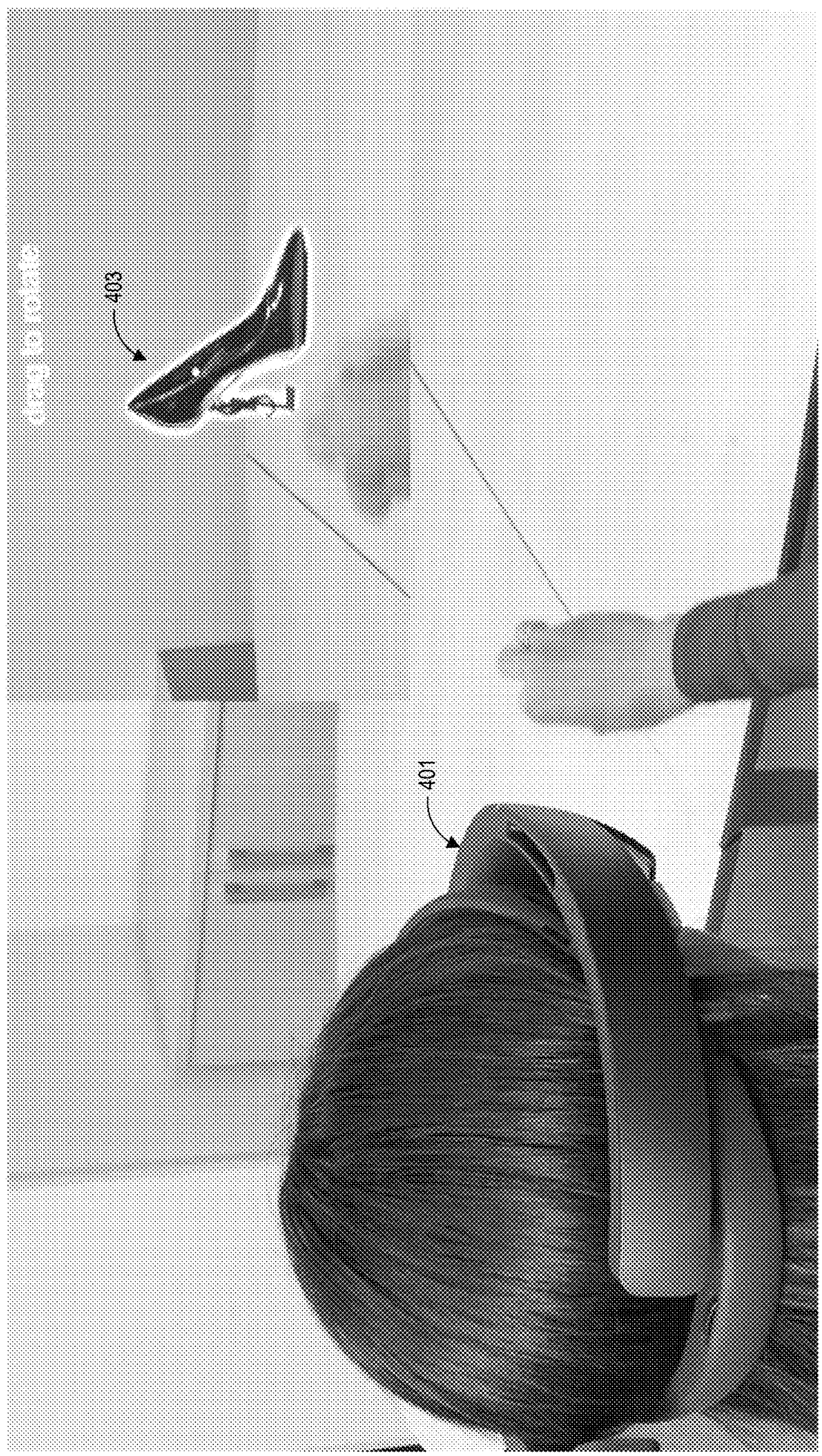
FIG. 4A-4C show example 3D views through an augmented reality (AR) headset.
Figure 4B:
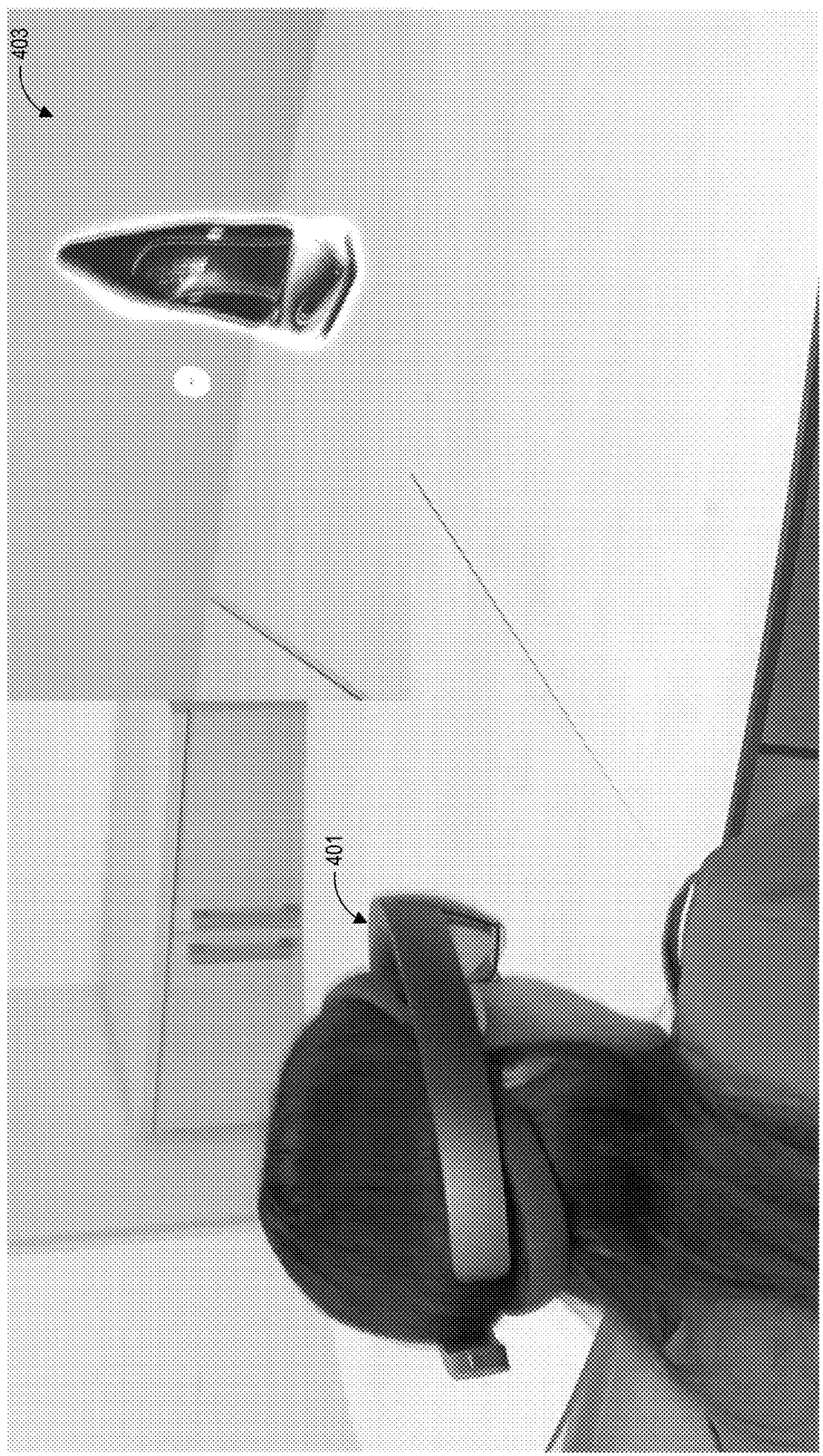
Figure 4C:
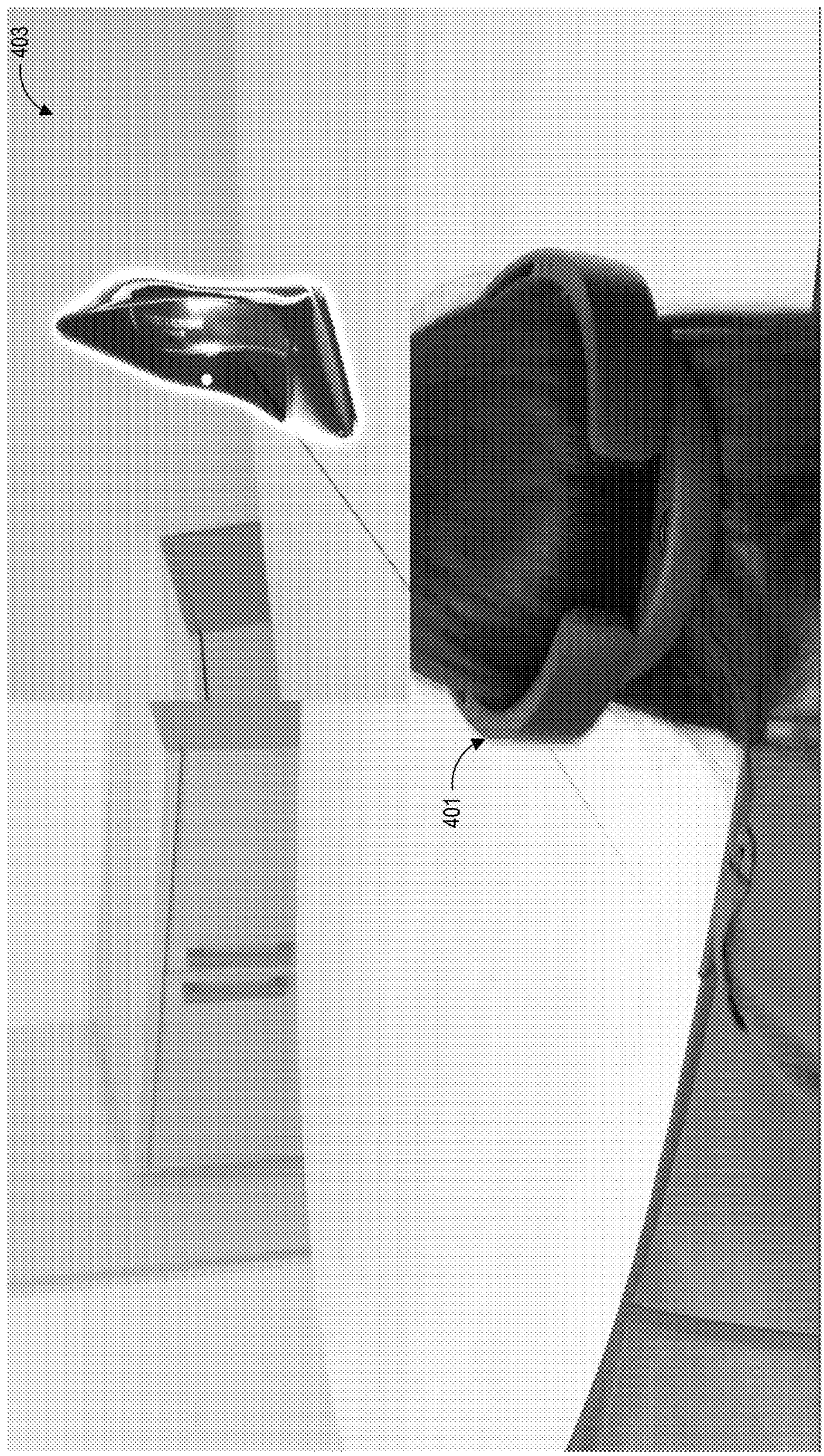

FIG. 4A, FIG. 4B, and FIG. 4C show example 3D views through an augmented reality (AR) headset. In FIG. 4A, a user wears an AR headset 401 that displays a 3D view 403 of a shoe in the AR headset 401 such that the user's view of reality is augmented with the 3D view 403. The user can use hand gestures and/or move a controller to rotate the 3D view 403 of the shoe. FIG. 4B shows the 3D view 403 that appears in the AR headset 401 to the user in response to the user moving the headset 401 to the left. FIG. 4C shows the 3D view 403 that appears in the AR headset 401 to the user in response to the user moving the headset 401 to the right. The 3D view 403 can be rotated in the AR headset to change the angle of the 3D view based on the relative viewing position of the AR headset. The AR techniques can be similarly implemented with virtual reality (VR) headsets.

Generating a 3D View

Figure 5:
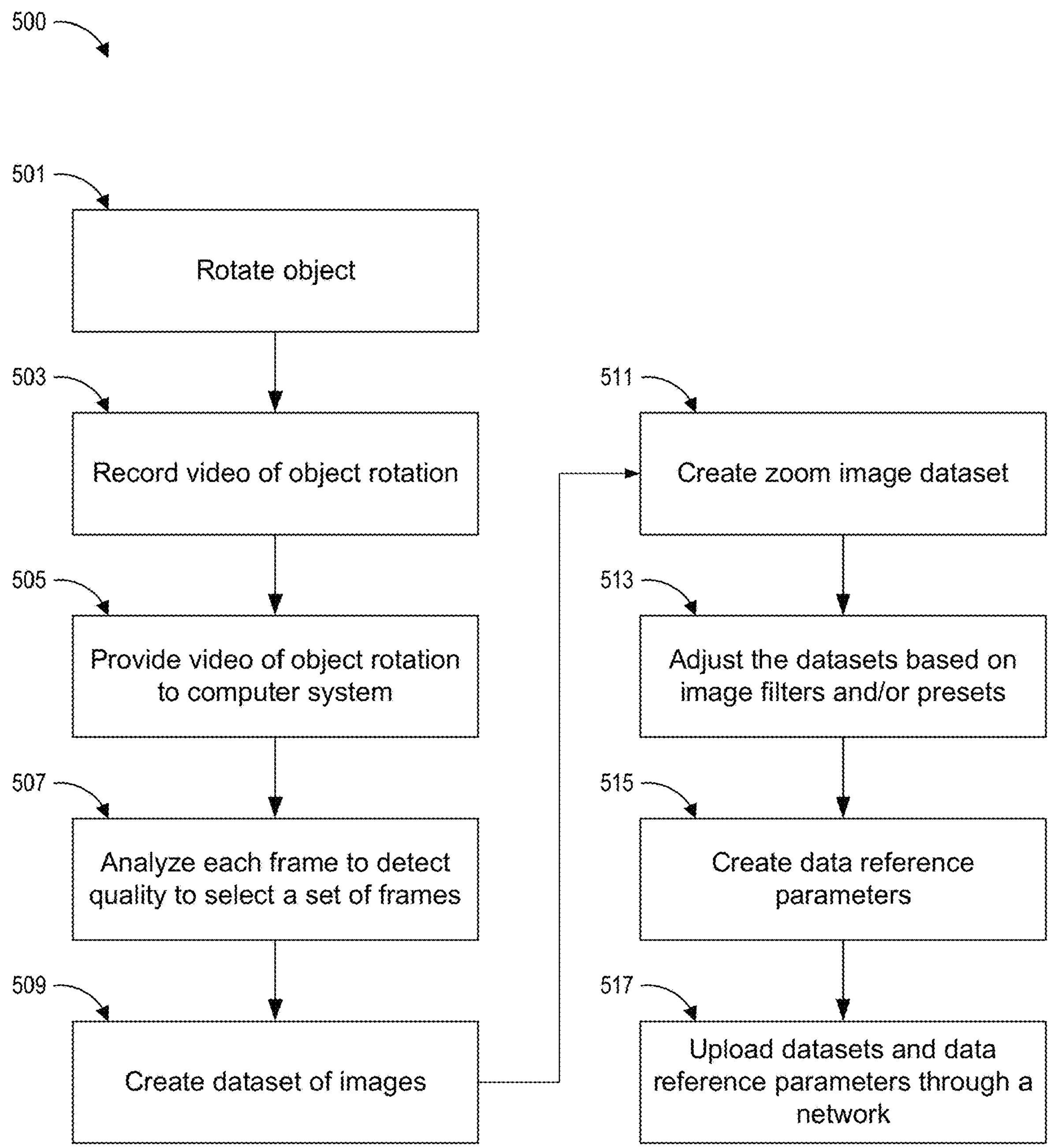
FIG. 5 shows a flowchart of an example process for generating a 3D view of an object by using a static camera and rotating the object.

FIG. 5 shows a flowchart 500 of an example process for generating a 3D view of an object by using a static camera and rotating the object. The process 500 can be implemented, in whole or in part, by a computer system, a mobile computing device, or a camera, among others.

At block 501, an object can be rotated. For example, the object can rest on a rotating turntable or other rotating surface such as a rotating sheet of paper. As other examples, the object can be manually rotated, suspended by a thin string and rotated in the air, and the like. The object can be rotated at least one full turn (at least 360 degrees), and in some embodiments more than a full turn, such as between 360 to 480 degrees.

At block 503, a camera can record a video of the object rotation. The camera can record the object rotating for at least one full turn such that the video includes a plurality of image frames showing the object from a plurality of angles around the object. In some embodiments, a set of photos showing the object from a plurality of angles around the object can be used in place of the video.

At block 505 the video of the object rotation can be provided to a computer system. The computer system can receive the video. A computer system can include, for example, a desktop, laptop, smart phone, remote server, and the like.

At block 507, the frames of the video can be analyzed to detect the quality of frames in order to select a set of frames. The frames can be analyzed to detect blurriness, artifacts, or other characteristics of low quality frames. The low quality frames can be omitted from the selected set of frames. When at least two frames show the object from the same or substantially similar angle, then of those two frames, the better quality frame can be selected for inclusion in the set of frames, such as when the video includes more than one rotation. The selected set of frames can include at least one frame within a threshold angle of rotation about the object, such as 0.5 degrees, 1 degree, 2 degrees or any other defined threshold angle.

At block 509, a dataset of images can be created. The dataset can be based on or include the selected set of frames such that the dataset includes at least one view of the object per threshold angle (such as at least one frame per 1 degree of rotation about the object). The dataset can include data indicating a position or angle between the frames and the object. The dataset of images can be used to show how the object looks from each angle as a user rotates the object in a 3D view.

At block 511, a zoom image dataset can be created. The zoom image dataset can include high resolution versions of the dataset of images. The zoom images dataset can be used to show details when users zoom in on the 3D views.

At block 513, one or more image filters or presets can be applied to the zoom image dataset and/or the zoom image dataset. The filters can include filters for brightness, contrast, color balance, white balance, sharpness, and the like.

At block 515, data reference parameters can be created or extracted. The data reference parameters can be used to help generate the 3D view on a variety of platforms and devices. The reference parameters can indicate, for example, which frame should be used as a default or front of a 3D view. The reference parameters can also include data about the equipment used for recording the video or taking the pictures, the recording parameters, frame masks, object dimensions, and information about the geometric shape of the object.

At block 517, the dataset of images, the zoom image dataset, and/or the reference parameters can be uploaded through a network to a remote computer system. The remote computer system can be configured to store the data and generate on or more 3D views of the object based at least in part on the dataset of images, the zoom image dataset, and/or the reference parameters.

Figure 6:
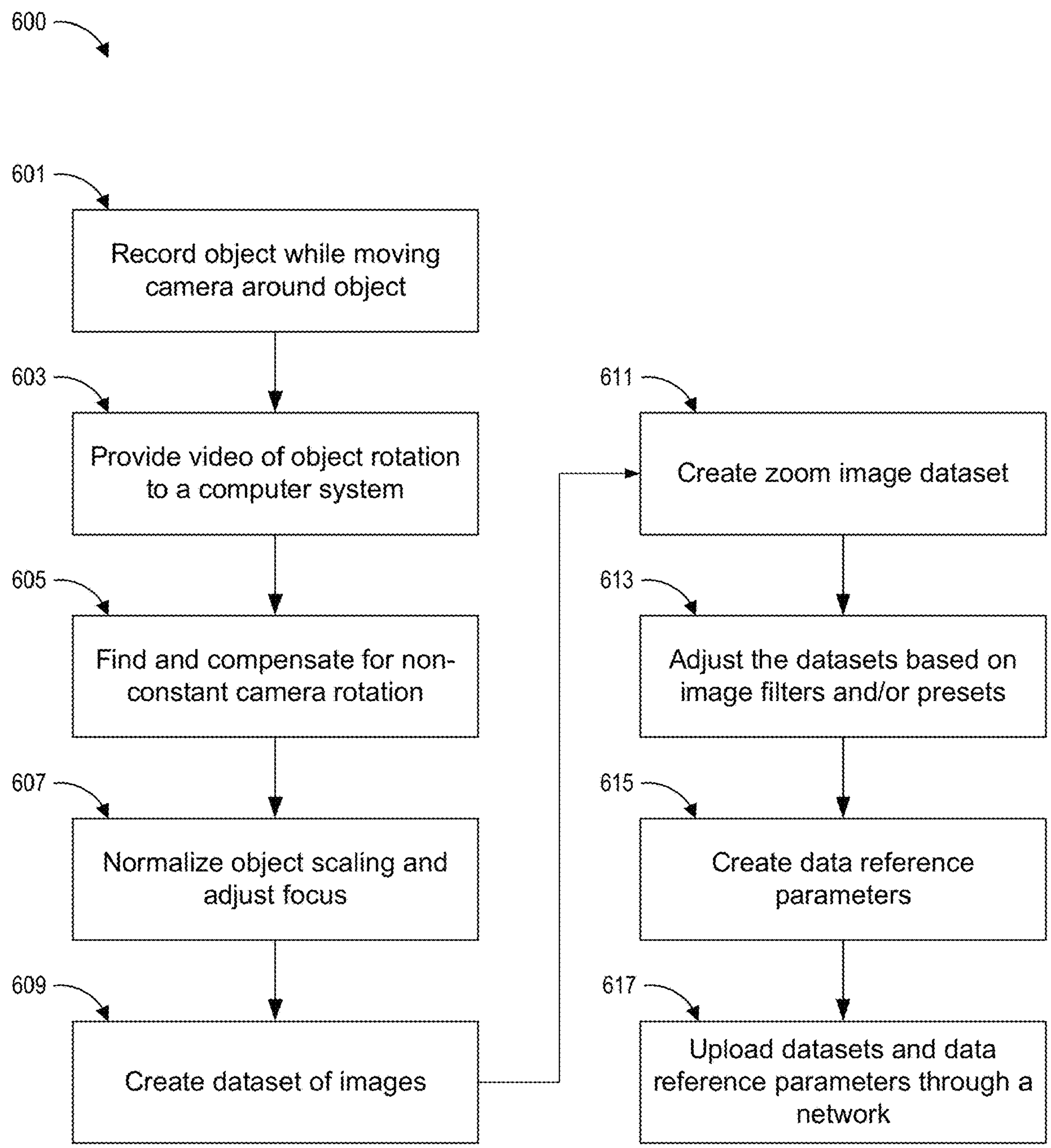
FIG. 6 shows a flowchart of an example process for generating a 3D view of a static object using a moving camera.

FIG. 6 shows a flowchart of an example process 600 for generating a 3D view of a static object using a moving camera. The process 600 can be implemented, in whole or in part, by a computer system, a mobile computing device, or a camera, among others.

At block 601, a camera is used to record an object while the camera is moved around the object. The camera can be moved in an orbit of at least one full rotation, and in some embodiments, the camera can be rotated 360 to 480 degrees or more. The camera can be manually carried around the object, moved along a track, or otherwise moved. The recorded video includes a plurality of image frames showing the object from a plurality of angles around the object. In some embodiments, a set of photos showing the object from a plurality of angles around the object can be used in place of the video.

At block 603, the video of the object rotation can be provided to a computer system. The computer system can receive the video. A computer system can include, for example, a desktop, laptop, smart phone, remote server, and the like.

At block 605, non-constant camera rotation can be identified and compensated for. Non-constant camera rotation can be identified manually or automatically based on the rotation of fixed reference markers. The fixed reference markers (such as a grid) can be displayed on the surface or background while the object was recorded in block 601. To compensate for non-constant rotation, frames from parts of the video showing slower rotation can be removed to speed up those parts of the video. Block 605 can optionally be performed during the process 500 discussed with respect to FIG. 5, such as before or after block 507, especially if the object was manually rotated at block 501.

With respect to FIG. 6, at block 607, the scaling of the object can be normalized and focus can be adjusted. The appearance of the object in the recorded frames may vary in size due to radial movement of the camera during block 601. Frames where the object appears smaller can be enlarged, and frames where the object appears larger can be reduced in size. Accordingly, the scaling of the object can be normalized. The size of the object indicates the radial distance between the object and the camera, and any focus variations caused by changes in the radial distance can also be compensated for.

At block 609, a dataset of images can be created. The dataset can be based on or include the selected set of frames such that the dataset includes at least one view of the object per threshold angle (such as at least one frame per 1 degree of rotation about the object). The dataset can include data indicating a position or angle between the frames and the object. The dataset of images can be used to show how the object looks from each angle as a user rotates the object in a 3D view.

At block 611, a zoom image dataset can be created. The zoom image dataset can include high resolution versions of the dataset of images. The zoom images dataset can be used to show details when users zoom in on the 3D views.

At block 613, one or more image filters or presets can be applied to the zoom image dataset and/or the zoom image dataset. The filters can include filters for brightness, contrast, color balance, white balance, sharpness, and the like.

At block 615, data reference parameters can be created or extracted. The data reference parameters can be used to help generate the 3D view on a variety of platforms and devices. The reference parameters can indicate, for example, which frame should be used as a default or front of a 3D view. The reference parameters can also include data about the equipment used for recording the video or taking the pictures, the recording parameters, frame masks, object dimensions, and information about the geometric shape of the object.

At block 617, the dataset of images, the zoom image dataset, and/or the reference parameters can be uploaded through a network to a remote computer system. The remote computer system can be configured to store the data and generate on or more 3D views of the object based at least in part on the dataset of images, the zoom image dataset, and/or the reference parameters.

Figure 7:
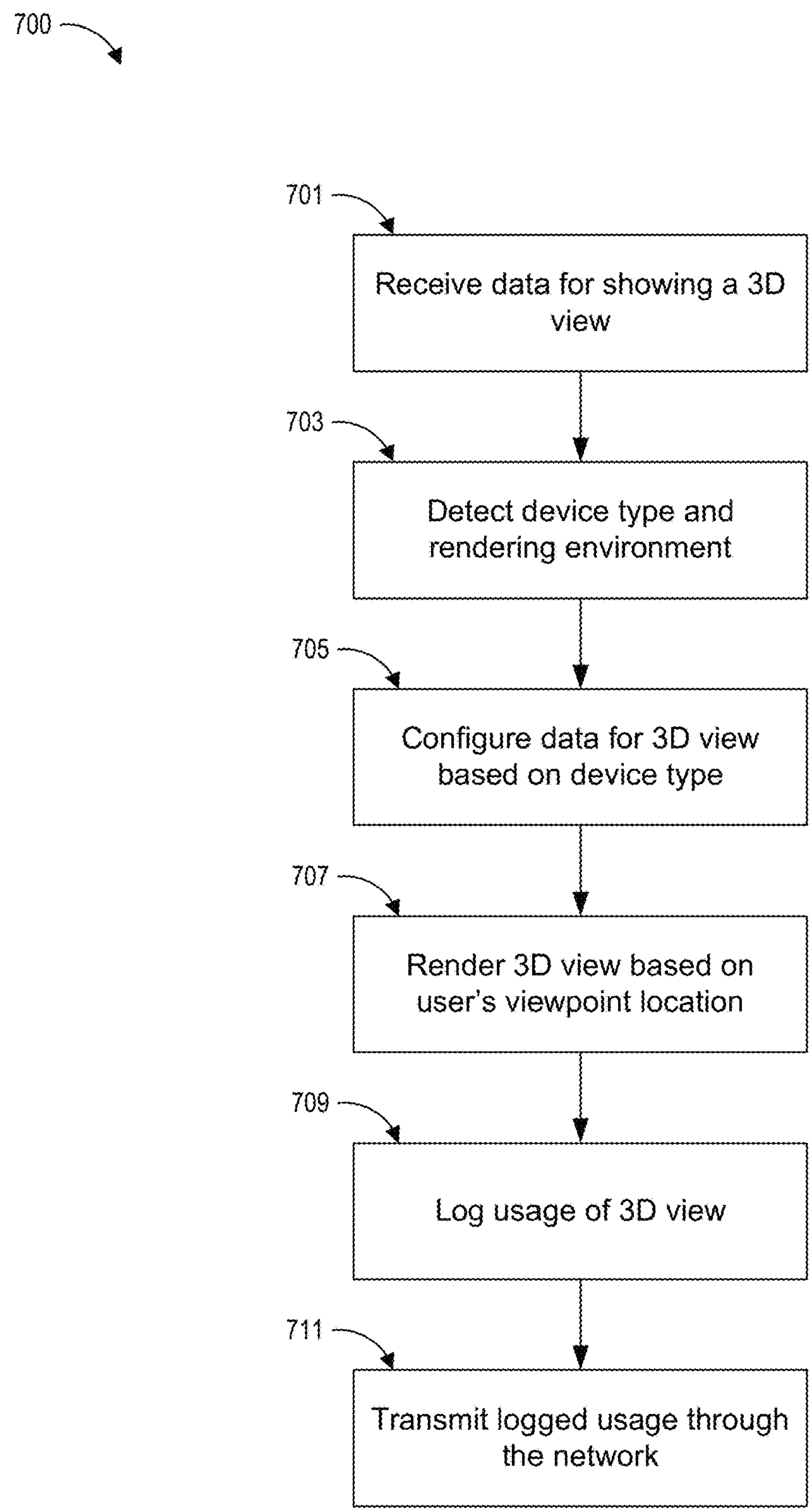
FIG. 7 shows a flowchart of an example process for displaying a 3D view of an object.

FIG. 7 shows a flowchart of an example process for displaying a 3D view of an object. The process 700 can be implemented, in whole or in part, by a computer system, a mobile computing device, or a camera, among others.

At block 701, data for showing a 3D view can be received. In some embodiments, the data for showing a 3D view can be downloaded from a server through a network connection such as the internet.

At block 703, a type of device and rendering environment can be detected. For example, it can be detected if the device is a computer with a monitor, a laptop with a screen, a smartphone, an AR headset, a VR headset, and the like. The rendering environment can include, for example, rendering as part of a website in an internet browser, rendering through a VR app, rendering in an AR environment, rendering in a mixed reality environment, and the like.

At block 705, the data for showing the 3D view can be configured based on the detected type of device and/or rendering environment. In some embodiments, the 3D view is configured by downloading or streaming supplemental data for displaying the 3D view on the detected type of device in the rendering environment. Different types of supplemental data can be downloaded or streamed based on the detected type of device and/or rendering environment. In some embodiments, the data for showing a 3D view can include data for showing the 3D view on a plurality of different types of devices in a plurality of different rendering environments, and a subset of the data for showing the 3D view is selected for showing the 3D view on the detected type of device in the detected rendering environment. In some embodiments, in response to detecting a type of device and/or rendering environment, the 3D view is configured to rotate in response to a respective type of user input.

At block 707, the 3D view is rendered based at least in part on a user's viewpoint. In the 3D view, an image of the object can be displayed. The image can change as the user's viewpoint changes such that object can be observed from a ring of viewpoint that orbits the object. As discussed with respect to FIG. 3A, FIG. 3B, FIG. 3C, FIG. 4A, FIG. 4B, and FIG. 4C, the user can interact with the 3D view to change the user's viewpoint with respect to the object. In some embodiments, such as in AR and VR environments, head tracking can be used to determine the user's viewpoint, and the 3D view can update in response to head movements.

At block 709, the user's interactions with the 3D view can be logged. This can include, for example, from which angles the object is viewed, the duration of viewing the object at various angles, how the user changes angles for viewing the object, the duration of viewing the 3D view, and the like.

At block 711, the log of the user's interactions with the 3D view can be transmitted through the network, such as to the server hosting the 3D view. This can allow the server to analyze the 3D view to determine which views are the most popular. The server can, in some cases, set a default view based on popular angles and/or set a 3D view to rotate through popular angles. The server can also analyze which parts of the object are the most interesting to see.

Figure 8:
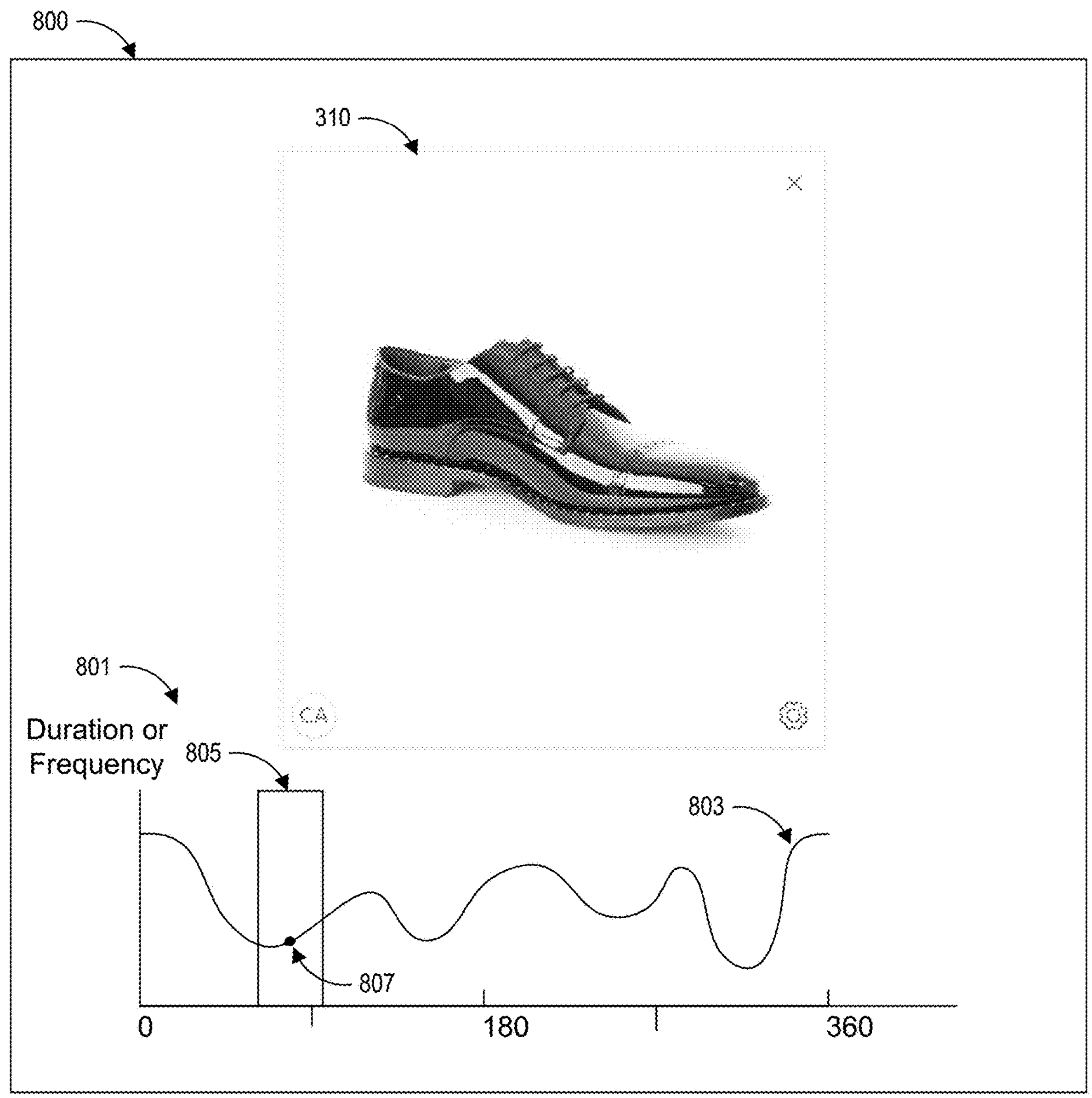
FIG. 8 shows an example user interface for reviewing log data.

FIG. 8 shows an example user interface 800 for reviewing log data. The user interface 800 includes a graph 801 showing a duration or frequency that a 3D view 310 is viewed from a range of angles from 0 to 360 degrees. A selection box 805 can be moved left or right along the graph, and the 3D view rotates clockwise or counter clockwise in response. The curve 803 shows an aggregate amount of time that the range of neighboring viewpoints included in the selection box 805 were viewed by one or more users. For example, the duration indicated at point 807 would include the duration that users viewed the object from about 65 degrees to 95 degrees. The graph can include data for one user or aggregate (such as average) data for a plurality of users. Other graphs, such as histograms for each angle or range of angles, can also be shown.

Server

Figure 9:
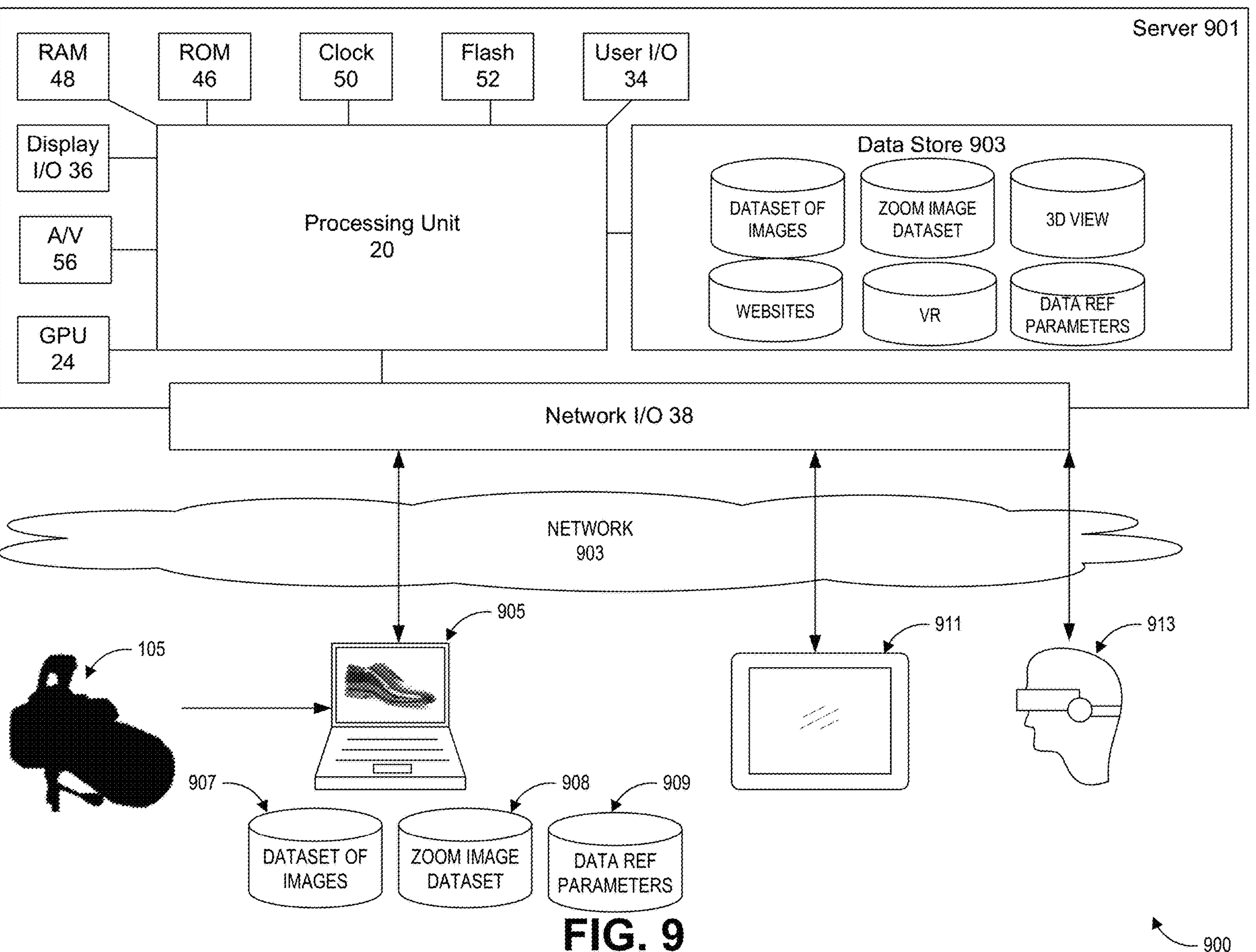
FIG. 9 shows an example system for displaying a 3D view.

FIG. 9 shows an example system 900 for displaying a 3D view. The system 900 includes a server 901, a network 903, a camera 105, a computer 905 storing datasets of images 907 and a zoom image dataset 908 and data reference parameters 909, a first user device such as a tablet 911 and a second user device such as an AR or VR headset 913. The server 901 includes a processing unit 20, user inputs/outputs 34, flash 52, a clock 50, read only memory 46, random access memory 48, a display input/output 36, audio/video interface 56, and storage 903. The data store 903 can include a transmitted copy of the dataset of images, a transmitted copy of the zoom image dataset, a transmitted copy of the data reference parameters, a 3D view file generated for the object, supplemental 3D view data for websites, and supplemental 3D view data for VR.

As discussed with respect to FIG. 1, FIG. 2, FIG. 5, and FIG. 6, the camera 105 can record a video or pictures of an object from at least 360 degrees. The video or pictures can be transferred to a computer 905. The computer 905 can process the images and generate a dataset of images 907, a zoom image dataset 908, and data reference parameters 909. The computer 905 can transfer a dataset of images 907, a zoom image dataset 908, and data reference parameters 909 through a network 903 to the server 901.

The server 901 can receive and store the dataset of images, the zoom image dataset, and the data reference parameters. The server 901 can also generate the 3D view and based on the dataset of images, the zoom image dataset, and the data reference parameters. The server 901 can also generate supplemental data for showing the 3D view on websites and in VR environments based on the dataset of images, the zoom image dataset, and the data reference parameters.

When the server receives a first request to show the 3D view through a website from a first computing device such as the tablet 911, the server can transfer the 3D view file to the tablet 911 and also transfer the supplemental data for showing the 3D view through a website. When the server receives a second request to show the 3D view in a VR environment from a second computing device such as the VR headset 913, the server can transfer the 3D view file to the VR headset 913 and also transfer the supplemental data for showing the 3D view in a VR environment. The server 901 can stream and/or transfer images from the zoom image dataset and/or the dataset of images as requested for showing the 3D view of the object.

As shown, the server 901 includes a processing unit 20 that interacts with other components of the server 901 and also components external to the server 901. The server 901 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the server 901 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The server 901 also includes various components for enabling input/output, such as a user I/O 34, a display I/O 36, and a network I/O 38. The input/output components may, in some cases, including touch-enabled devices. Data store 903 can include internal or removable storage for the server 901. The data store 903 can store the datasets and data reference parameters received from the computer 905. The data store 903 can also be configured to store a 3D view generated based on the datasets and data reference parameters and also store any supplemental data for displaying the 3D view on different types of devices and/or in different rendering environments. In addition to storage 40 and removable storage media 44, the server 901 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images such as to a monitor. Network I/O 38 is used for input/output functions for a network. Network I/O 38 may be used to transfer the 3D view, datasets, data reference parameters, and/or supplemental data for showing the 3D view.

Display output signals may be produced by the display I/O 36 and can include signals for displaying visual content produced by the server 901 on a display device, such as graphics, user interfaces, video, and/or other visual content.

The server 901 can also include other features, such as a clock 50, flash memory 52, and other components. An audio/video player 56 might also be used to show the 3D view. It should be understood that other components may be provided in the server 901 and that a person skilled in the art will appreciate other variations of the server 901.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in the data store 903, and/or on removable media such, or obtained over a network or other electronic channel as needed). In general, program code can be found embodied in a tangible non-transitory computer-readable medium.

Random access memory (RAM) 48 (and possibly other storage) is usable to store variables and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the server 901 is turned off or loses power.

Figure 10:
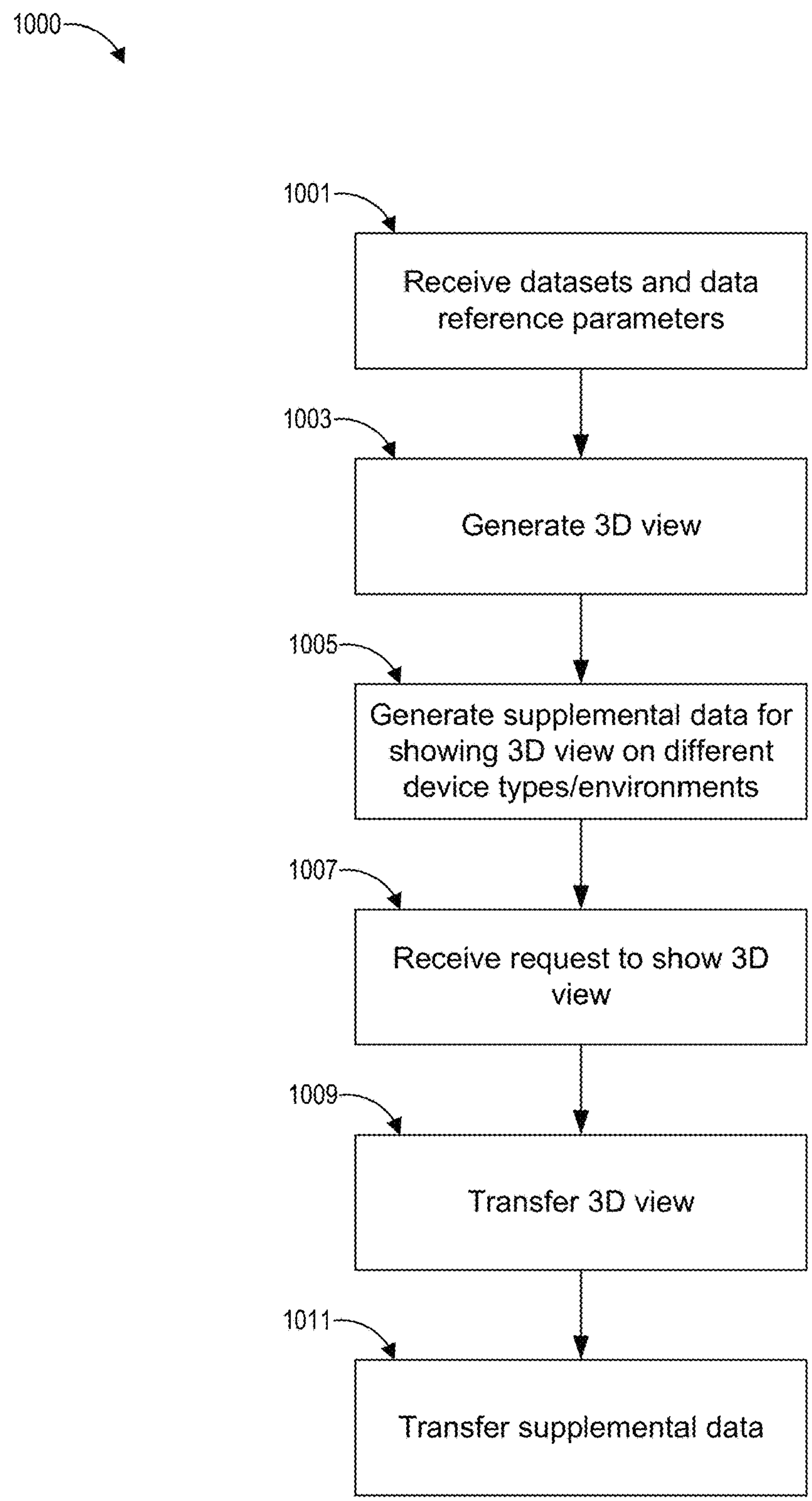
FIG. 10 shows a flowchart of an example process for hosting a 3D view of an object.

FIG. 10 shows a flowchart 1000 of an example process for hosting a 3D view of an object. The process 1000 can be implemented, in whole or in part, by a computer system or a mobile computing device, among others.

At block 1000, datasets and/or data reference parameters can be received. The datasets can be received, for example, from a computer system uploading the datasets and/or data reference parameters at block 517 of FIG. 5 or 617 of FIG. 6.

At block 1003, a 3D view of an object can be generated based at least in part on the datasets and the data reference parameters.

At block 1005, supplemental data for the 3D view can be generated for showing the 3D view on different types of devices and/or rendering environment.

At block 1007, a request an be received for showing a 3D view of the object. For example, clients can request the 3D view of the object to be displayed embedded in a website, as part of a game, in a virtual or augmented reality environment, and the like. Some clients may use an API to request that the 3D view of the object be shown. Some clients may request, through code on a website, that the 3D view be shown. For example, a website may use an iframe in HTML5 to request that the 3D view of the object be shown. As another example, a website can use a plugin, such as the PrestaShop plugin (available at http://cappasity.com/prestashop), to embed the 3D view of the object in a webpage. The client may identify which 3D view to see using a unique identifier associated with each 3D view.

At block 1009, the 3D view can be transferred to the client. In some embodiments, the data can be streamed as needed. For example, image data of a selected viewpoint and/or neighboring viewpoints can be streamed and/or buffered as a user selects viewpoints. In some embodiments, the zoom dataset can be transferred to allow a user to zoom in, or individual images from the zoom dataset can be transferred in response to a user selecting a zoom from an individual viewpoint.

At block 1011, supplemental data for rendering on the client device can be transferred based on the type and/or rendering environment of the client device.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:

a data store including a plurality of 3D views for objects; and one or more processors configured to execute computer-readable instructions in order to:

receive a request for a 3D view for an object;

transmit the 3D view for the object; and receive a data log including usage statistics about the frequency at which the object is viewed from different angles.

2. The computer system of claim 1, wherein the one or more processors are further configured to:

transmit data for generating a user interface including:

a graph generated based at least in part on the data log; and a 3D view of the object.

3. The computer system of claim 2, wherein the graph indicates an aggregate or average viewing durations of the object based on a plurality of data logs for the object.

4. The computer system of claim 3, wherein:

an x-axis of the graph shows a viewpoint for viewing the object from;

a y-axis of the graph indicates a duration of viewing the object; and the duration for each (x, y) point on the graph is based on a duration of a range of viewpoints.

5. The computer system of claim 1, wherein the one or more processors are further configured to, based at least in part on the data log, indicate a most popular viewpoint or a viewpoint viewed for a longest duration.

6. The computer system of claim 1, wherein the one or more processors are further configured to:

receive an indication of a device type or rendering environment;

select, from among a plurality of supplemental data, a first supplemental data for generating the 3D view in response to the device type or rendering environment; and transmit the first supplemental data.

7. The computer system of claim 1, wherein the one or more processors are further configured to:

receive a request to show a zoomed in view of the object; and in response to the request, transmit at least an image from a zoom dataset of the object.

8. A computer-implemented method comprising:

by one or more processors executing computer-readable instructions, receiving a request for a 3D view for an object;

transmitting the 3D view for the object; and receiving a data log including usage statistics about the frequency at which the object is viewed from different angles.

9. The computer-implemented method of claim 8 further comprising:

transmitting data for generating a user interface including:

a graph generated based at least in part on the data log; and a 3D view of the object.

10. The computer-implemented method of claim 9, wherein the graph indicates an aggregate or average viewing durations of the object based on a plurality of data logs for the object.

11. The computer-implemented method of claim 10, wherein:

an x-axis of the graph shows a viewpoint for viewing the object from;

a y-axis of the graph indicates a duration of viewing the object; and the duration for each (x, y) point on the graph is based on a duration of a range of viewpoints.

12. The computer-implemented method of claim 8 further comprising:

based at least in part on the data log, indicating a most popular viewpoint or a viewpoint viewed for a longest duration.

13. The computer-implemented method of claim 8 further comprising:

receiving an indication of a device type or rendering environment;

selecting, from among a plurality of supplemental data, a first supplemental data for generating the 3D view in response to the device type or rendering environment; and transmitting the first supplemental data.

14. The computer-implemented method of claim 8 further comprising:

receiving a request to show a zoomed in view of the object; and in response to the request, transmitting at least an image from a zoom dataset of the object.

15. A non-transitory computer storage having storage thereon a computer program, the computer program including executable instructions that instruct a computer system to at least:

receive a request for a 3D view for an object;

transmit the 3D view for the object; and receive a data log including usage statistics about the frequency at which the object is viewed from different angles.

16. The non-transitory computer storage of claim 15, wherein the executable instructions further instruct the computer system to:

transmit data for generating a user interface including:

a graph generated based at least in part on the data log; and a 3D view of the object.

17. The non-transitory computer storage of claim 16, wherein the graph indicates an aggregate or average viewing durations of the object based on a plurality of data logs for the object.

18. The non-transitory computer storage of claim 17, wherein:

an x-axis of the graph shows a viewpoint for viewing the object from;

a y-axis of the graph indicates a duration of viewing the object; and the duration for each (x, y) point on the graph is based on a duration of a range of viewpoints.

19. The non-transitory computer storage of claim 15, wherein the executable instructions further instruct the computer system to:

based at least in part on the data log, indicate a most popular viewpoint or a viewpoint viewed for a longest duration.

20. The non-transitory computer storage of claim 15, wherein the executable instructions further instruct the computer system to:

receive an indication of a device type or rendering environment;

select, from among a plurality of supplemental data, a first supplemental data for generating the 3D view in response to the device type or rendering environment; and transmit the first supplemental data.

* * * * *